(12) United States Patent
Kumar

(10) Patent No.: US 11,042,853 B2
(45) Date of Patent: Jun. 22, 2021

(54) SYSTEM AND METHOD FOR PROVISIONING A GIFT WITH A UNIFORM RESOURCE LOCATOR

(71) Applicant: Visa International Service Association, San Francisco, CA (US)

(72) Inventor: Satish Kumar, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 16/204,294

(22) Filed: Nov. 29, 2018

(65) Prior Publication Data
US 2020/0175484 A1    Jun. 4, 2020

(51) Int. Cl.
| | | |
|---|---|---|
| *G06F 16/955* | (2019.01) | |
| *G06N 20/00* | (2019.01) | |
| *G06Q 20/12* | (2012.01) | |
| *G06Q 20/40* | (2012.01) | |
| *G06Q 20/38* | (2012.01) | |

(52) U.S. Cl.
CPC ......... *G06Q 20/12* (2013.01); *G06F 16/9566* (2019.01); *G06N 20/00* (2019.01); *G06Q 20/405* (2013.01); *G06Q 20/385* (2013.01); *G06Q 20/3827* (2013.01)

(58) Field of Classification Search
CPC .................................................... G06Q 20/12
See application file for complete search history.

(56) References Cited

U.S. PATENT DOCUMENTS

| | | | |
|---|---|---|---|
| 6,948,063 B1* | 9/2005 | Ganesan | G06F 21/445 |
| | | | 705/53 |
| 8,239,445 B1* | 8/2012 | Gage | H04L 29/06 |
| | | | 709/203 |
| 8,500,006 B2 | 8/2013 | Carlson et al. | |
| 10,445,802 B1* | 10/2019 | Adiseshan | G06Q 30/0621 |
| 2006/0047814 A1* | 3/2006 | Batz | H04L 63/10 |
| | | | 709/226 |
| 2007/0267485 A1* | 11/2007 | Ferrara | G06Q 30/0621 |
| | | | 235/380 |
| 2012/0215610 A1 | 8/2012 | Amaro et al. | |

(Continued)

OTHER PUBLICATIONS

Antoine Limasset, Guillaume Rizk, Rayan Chikhi, and Pierre Peterlongo, 2017, "Fast and Scalable Minimal Perfect Hashing for Massive Key Sets," Leibniz International Proceedings in Informatics.*

*Primary Examiner* — Olabode Akintola
*Assistant Examiner* — Brandon M Duck
(74) *Attorney, Agent, or Firm* — The Webb Law Firm

(57) ABSTRACT

Provided herein are systems and methods for provisioning a gift. The method includes receiving, with at least one processor, a request to provision a gift, the request comprising a uniform resource locator (URL) corresponding to a network location associated with a merchant and/or item, generating, with at least one processor, a modified URL configured to direct a user device to the network location associated with the merchant and/or item, the modified URL based on the original URL, an account identifier, and one or more account limits, and transmitting, with at least one processor, the modified URL to the user device, such that the user device is facilitated to engage in a transaction through the network location associated with the merchant and/or item using a payment account associated with the account identifier.

21 Claims, 5 Drawing Sheets

(56) References Cited

U.S. PATENT DOCUMENTS

| | | |
|---|---|---|
| 2014/0222533 A1 | 8/2014 | Ovick et al. |
| 2014/0372251 A1* | 12/2014 | Rodell ................ G06F 3/04842 |
| | | 705/26.7 |
| 2017/0093780 A1* | 3/2017 | Lieb .......................... G06T 3/40 |
| 2017/0132627 A1* | 5/2017 | Phillips .............. G06Q 30/0613 |
| 2019/0121946 A1* | 4/2019 | Kuenzi ................... G06F 21/35 |
| 2020/0036751 A1* | 1/2020 | Kohavi ............... H04L 63/1425 |

* cited by examiner

SYSTEM AND METHOD FOR PROVISIONING A GIFT WITH A UNIFORM RESOURCE LOCATOR

BACKGROUND OF THE DISCLOSURE

1. Field of the Disclosure

Disclosed embodiments relate generally to a system and method for providing a gift to a recipient and, in one particular embodiment or aspect, to a system and method for providing a gift to a recipient in the form of a uniform resource locator that includes the identity of the gift and payment information and that eliminates the need to first purchase that gift.

2. Technical Considerations

Technological developments have allowed for significant developments in electronic commerce in terms of how consumers can browse, select, and purchase goods and services. However, despite these developments, advances in gifting have been nonexistent.

Currently, as has been the case since the advent of gift-giving, an individual or organization that wishes to bestow a gift on a recipient is required to purchase the item. While the giver can have the item directly shipped to a recipient, all purchase paperwork, for example, in terms of warranties, proofs-of-purchase, and the like, remain in the purchaser's name, which can complicate the recipient's ability to exchange or obtain coverage for a gift.

Moreover, if a specific gift is not desired or cannot be identified, the gift-giver is limited to the purchase, and physical transfer, of gift cards or gift certificates. The conveyance of such gifts can be seen as impersonal and is often not desirable.

Accordingly, there is a need in the art for a method and system for enabling a gift-giver to provide a gift to a recipient without requiring the gift-giver to first purchase the item. Such a solution is possible when gifts can be given by providing a uniform resource locator (URL) that includes information identifying a merchant, item, and account information, and enables the gift-giver to provide the URL to a recipient using electronic methods.

SUMMARY OF THE DISCLOSURE

According to a non-limiting embodiment or aspect, provided is a computer-implemented method for provisioning a gift, including the steps of receiving, with at least one processor, a request to provision a gift, the request comprising a uniform resource locator (URL) corresponding to a network location associated with a merchant and/or item; generating, with at least one processor, a modified URL configured to direct a user device to the network location associated with the merchant and/or item, the modified URL based on the original URL, an account identifier, and one or more account limits; and transmitting, with at least one processor, the modified URL to the user device, such that the user device is facilitated to engage in a transaction through the network location associated with the merchant and/or item using a payment account associated with the account identifier.

According to another non-limiting embodiment or aspect, provided is a computer-implemented method for provisioning a gift, including the steps of receiving, from a cardholder device and with at least one processor, a request to provision a gift, the request comprising a uniform resource locator (URL) corresponding to an application or webpage associated with a merchant or item; generating, with at least one processor, a modified URL configured to direct a recipient device to the application or webpage associated with the merchant or item, the modified URL based on the URL, an account identifier, and one or more account limits; transmitting, with at least one processor, the modified URL to the cardholder device; receiving, with at least one processor, the modified URL from the recipient device; determining, with at least one processor, the URL and account identifier from the modified URL; and transmitting, with at least one processor, a transaction authorization request to an issuer system associated with the account identifier.

According to a non-limiting embodiment or aspect, provided is a system for provisioning a gift, the system having a processor programmed or configured to a processor programmed or configured to: receive a request to transmit a gift, the request comprising a uniform resource locator (URL) corresponding to an application or webpage associated with a merchant or item; generate a modified URL configured to direct a user device to the application or webpage associated with the merchant or item, the modified URL based on the URL, an account identifier, and one or more account limits; and transmit the modified URL to the user device.

According to another non-limiting embodiment or aspect, provided herein is a system for provisioning a gift, the system having a processor programmed or configured to receive, from a cardholder device, a request to transmit a gift, the request comprising a uniform resource locator (URL) corresponding to an application or webpage associated with a merchant or item; generate a modified URL configured to direct a recipient device to the application or webpage associated with the merchant or item, the modified URL based on the URL, an account identifier, and one or more account limits; transmit the modified URL to the cardholder device; receive the modified URL from the recipient device; determine the original URL and account identifier from the modified URL; and transmit a transaction authorization request to an issuer system associated with the account identifier.

According to another non-limiting embodiment or aspect, provided herein is a system for provisioning a gift, the system having at least one first processor programmed or configured to: receive a request to transmit a gift, the request comprising a uniform resource locator (URL) corresponding to an application or webpage associated with a merchant or item; generate a modified URL configured to direct a user device to the application or webpage associated with the merchant or item, the modified URL based on the URL, an account identifier, and one or more account limits; and transmit the modified URL to the user device; and at least one second processor programmed or configured to: receive the modified URL from a user device; determine the URL and account identifier from the modified URL; and transmit a transaction authorization request to an issuer system associated with the account identifier.

According to another non-limiting embodiment or aspect, provided herein is a computer program product for provisioning a gift, including at least one non-transitory computer-readable medium including program instructions that, when executed by at least one processor, causes the at least one processor to receive a request to provision a gift, the request comprising a uniform resource locator (URL) corresponding to a network location associated with a merchant and/or item, generate a modified URL configured to direct a user device to the network location associated with the merchant and/or item, the modified URL based on the original URL, an account identifier, and one or more account limits, and transmit the modified URL to the user device, such that the user device is facilitated to engage in a transaction through the network location associated with the merchant and/or item using a payment account associated with the account identifier.

Further embodiments or aspects are set forth in the following numbered clauses:

Clause 1: A computer-implemented method for provisioning a gift, comprising: receiving, with at least one processor, a request to provision a gift, the request comprising a uniform resource locator (URL) corresponding to a network location associated with a merchant and/or item; generating, with at least one processor, a modified URL configured to direct a user device to the network location associated with the merchant and/or item, the modified URL based on the original URL, an account identifier, and one or more account limits; and transmitting, with at least one processor, the modified URL to the user device, such that the user device is facilitated to engage in a transaction through the network location associated with the merchant and/or item using a payment account associated with the account identifier.

Clause 2: The computer-implemented method of clause 1, further comprising, in response to receiving the URL, validating the URL.

Clause 3: The computer-implemented method of clause 2, wherein validating the URL comprises one or more of: determining whether the original URL corresponds to a known merchant; and determining whether the original, URL corresponds to an item that can be purchased.

Clause 4: The computer-implemented method of clause 2 or 3, wherein validating the URL is based at least partially on a machine learning algorithm.

Clause 5: The computer-implemented method of any of clauses 1-4, wherein the one or more account limits comprise one or more of: a category limit; an item limit; a price limit; a time limit; and an identity limit.

Clause 6: The computer-implemented method of clause 5, wherein the price limit is a maximum amount or an exact amount.

Clause 7: The computer-implemented method of clause 5, wherein the identity limit is an email address or telephone number associated with a recipient of the modified URL.

Clause 8: The computer-implemented method of any of clauses 1-7, wherein the account identifier is a primary account number (PAN).

Clause 9: The computer-implemented method of clause 8, wherein the account identifier is a token associated with the PAN.

Clause 10: The computer-implemented method of any of clauses 1-9, wherein generating the modified URL comprises generating a random value or hashing one or more of the original URL, the account identifier, and the one or more account limits.

Clause 11: The computer-implemented method of any of clauses 1-10, wherein generating the modified URL comprises transmitting, with at least one processor, a transaction authorization request to an issuer system associated with the account identifier and, optionally, receiving, with at least one processor and from the issuer system, an indication that the transaction is authorized.

Clause 12: The computer-implemented method of any of clauses 1-11, wherein generating the modified URL comprises generating a short URL that redirects a user device to the modified URL.

Clause 13: The computer-implemented method of any of clauses 1-12, wherein the method further comprises: receiving, from a user device and with at least one processor, the modified URL; determining, with at least one processor, the original URL and account identifier from the modified URL; and transmitting, with at least one processor, a transaction authorization request to an issuer system associated with the account identifier.

Clause 14: The computer-implemented method of clause 13, wherein determining the URL and account identifier comprises: receiving, from a merchant system and with at least one processor, the modified URL; determining, with at least one processor and from a database, the URL and account identifier; and transmitting, with at least one processor, the URL and account identifier to the merchant system.

Clause 15: The computer-implemented method of clause 13, wherein transmitting the original URL and account identifier comprises generating a token comprising the account identifier and transmitting the URL and token to the merchant system.

Clause 16: A computer-implemented method for provisioning a gift, comprising: receiving, from a cardholder device and with at least one processor, a request to provision a gift, the request comprising a uniform resource locator (URL) corresponding to an application or webpage associated with a merchant or item; generating, with at least one processor, a modified URL configured to direct a recipient device to the application or webpage associated with the merchant or item, the modified URL based on the URL, an account identifier, and one or more account limits; transmitting, with at least one processor, the modified URL to the cardholder device; receiving, with at least one processor, the modified URL from the recipient device; determining, with at least one processor, the URL and account identifier from the modified URL; and transmitting, with at least one processor, a transaction authorization request to an issuer system associated with the account identifier.

Clause 17: A system for provisioning a gift, comprising a processor programmed or configured to: receive a request to transmit a gift, the request comprising a uniform resource locator (URL) corresponding to an application or webpage associated with a merchant or item; generate a modified URL configured to direct a user device to the application or webpage associated with the merchant or item, the modified URL based on the URL, an account identifier, and one or more account limits; and transmit the modified URL to the user device.

Clause 18: A system for provisioning a gift, comprising a processor programmed or configured to: receive, from a cardholder device, a request to transmit a gift, the request comprising a uniform resource locator (URL) corresponding to an application or webpage associated with a merchant or item; generate a modified URL configured to direct a recipient device to the application or webpage associated with the merchant or item, the modified URL based on the URL, an account identifier, and one or more account limits; transmit the modified URL to the cardholder device; receive the modified URL from the recipient device; determine the original URL and account identifier from the modified URL; and transmit a transaction authorization request to an issuer system associated with the account identifier.

Clause 19: A system for provisioning a gift, comprising: at least one first processor programmed or configured to: receive a request to transmit a gift, the request comprising a uniform resource locator (URL) corresponding to an application or webpage associated with a merchant or item;

generate a modified URL configured to direct a user device to the application or webpage associated with the merchant or item, the modified URL based on the URL, an account identifier, and one or more account limits; and transmit the modified URL to the user device; and at least one second processor programmed or configured to: receive the modified URL from a user device; determine the URL and account identifier from the modified URL; and transmit a transaction authorization request to an issuer system associated with the account identifier.

Clause 20: A computer program product for provisioning a gift, including at least one non-transitory computer-readable medium including program instructions that, when executed by at least one processor, causes the at least one processor to receive a request to provision a gift, the request comprising a uniform resource locator (URL) corresponding to a network location associated with a merchant and/or item, generate a modified URL configured to direct a user device to the network location associated with the merchant and/or item, the modified URL based on the original URL, an account identifier, and one or more account limits, and transmit the modified URL to the user device, such that the user device is facilitated to engage in a transaction through the network location associated with the merchant and/or item using a payment account associated with the account identifier.

BRIEF DESCRIPTION OF THE DRAWINGS

Additional advantages and details are explained in greater detail below with reference to the exemplary embodiments and aspects that are illustrated in the accompanying schematic figures, in which.

DESCRIPTION

Figure 1:
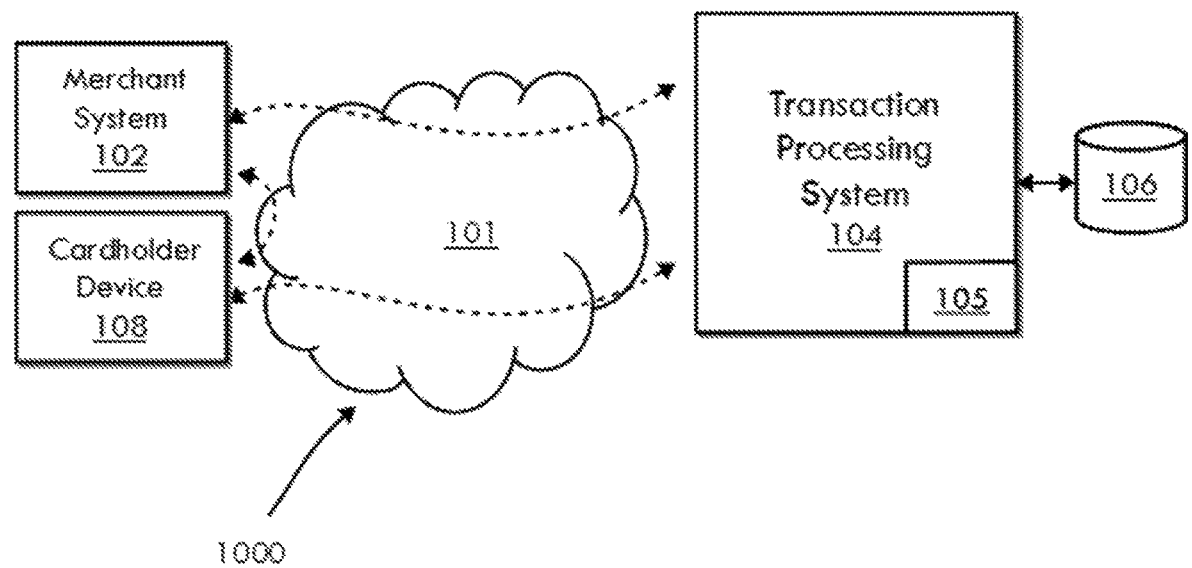
FIG. 1 is a schematic diagram of one non-limiting embodiment or aspect of a system for provisioning a gift with a URL.

For purposes of the description hereinafter, the terms "upper," "lower," "right," "left," "vertical," "horizontal," "top," "bottom," "lateral," "longitudinal," and derivatives thereof shall relate to the orientation shown in the drawing figures. However, it is to be understood that the systems and methods disclosed herein may assume various alternative variations and step sequences, except where expressly specified to the contrary. It is also to be understood that the specific devices and the method illustrated in the attached drawings, and described in the following specification, are simply exemplary embodiments. Hence, specific dimensions and other physical characteristics related to the embodiments disclosed herein are not to be considered as limiting.

As used herein, the terms "communication," "communicate," and/or "transmit" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "issuer system" may refer to one or more computer systems operated by or on behalf of an issuer institution, such as a server computer executing one or more software applications. For example, an issuer system may include one or more authorization servers for authorizing a payment transaction.

As used herein, the term "issuer institution" may refer to one or more entities, such as a bank, that provides accounts to customers for conducting payment transactions, such as initiating credit and/or debit payments. For example, an issuer institution may provide an account identifier, such as a primary account number (PAN), to a customer that uniquely identifies one or more accounts associated with that customer. The account identifier may be embodied on a physical financial instrument, such as a payment device, and/or may be electronic and used for electronic payments.

As used herein, the term "account identifier" may include one or more PANs, tokens, or other identifiers associated with a customer account. An account identifier may be directly or indirectly associated with an issuer institution, such that an account identifier may be a token that maps to a PAN or other type of account identifier. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifiers in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" refers to any individual or entity that provides goods and/or services, or access to goods and/or services, to customers based on a transaction, such as a payment transaction. Merchants may include, but are not limited to, restaurants, food trucks, clubs, gymnasiums, retail stores, professional services providers (e.g., dentists, doctors, plumbers, etc.), parks, museums, attractions, sporting venues, and/or the like. It will be appreciated that numerous other types of merchants are within the scope of this disclosure.

As used herein, the term "merchant system" may refer to one or more server computers, point-of-sale devices, online interfaces, third-party hosted services, and/or the like that are used to complete transactions with one or more payment devices. The term merchant system may also refer to one or more server computers, processors, online interfaces, third-party hosted services, and/or the like that are used to transmit and/or receive communications with issuer institutions, transaction service providers, transaction processing servers, payment device holders, and/or the like.

As used herein, the term "payment device" may refer to a portable (e.g., physical) payment card, a gift card, a smartcard, a smart media, a payroll card, a healthcare card, an electronic payment device such as a debit or credit card with a Europay, MasterCard, and Visa (EMV) chip (e.g., a chip card, smart credit card or the like), a wristband, a machine-readable medium containing account information, a keychain device, a supermarket discount card, a cellular phone, a mobile device, a personal digital assistant (PDA), a pager, a security card, a computer, an access card, a wireless terminal, a device with a mobile payment application (e.g., a mobile device with an electronic wallet application) or a transponder. The payment device may include volatile or non-volatile memory to store information, such as the account number or a name of the account holder. The term "payment device" may also refer to any unique account identifier, physical or digital, associated with a financial transaction account that can be used to complete a transaction between a user of the payment device and another party, such as a merchant. For example, a payment device may be a financial transaction account number and confirmation code that may be entered into an online store payment interface. It will be appreciated that many other configurations and embodiments are possible.

As used herein, the terms "computing device," "mobile device," "recipient device," and "cardholder device" may refer to one or more electronic devices that are configured to directly or indirectly communicate with or over one or more networks. The devices may include a computer, a desktop computer, a server, a client device, a cellular phone (e.g., a smartphone or standard cellular phone), a portable computer, a wearable device (e.g., watches, glasses, lenses, clothing, and/or the like), a PDA, and/or other like devices.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider As used herein, the term "URL generation system" may refer to one or more computer systems operated by or on behalf of a transaction service provider, an issuer institution, a third-party service provider, or merchant. A "URL generation system" may refer to one or more computer systems that generates a uniform resource locator (URL), for example, a modified URL as described below.

As used herein, the term "account limit" may refer to one or more limitations applied to an account linked to a user's payment device. As an example, a user's account, when applied to a gift provisioning system and method as disclosed herein, may include limits on the merchant type, the merchant itself, the category of product or service, the product or service itself, a price limit, a time limit, and/or an identity limit.

As used herein, the term "machine learning" may refer to one or more at least partially automated, iterative data analyses that identify patterns in one or more sets of data and make decisions based at least in part on those patterns. Machine learning may include one or more analytical techniques such as neural networks, decision trees, classification and regression trees, random forests, associations and sequence discovery, bagging, boosting, support vector machines, learning vector quantization, nearest-neighbor mapping (including k-nearest neighbors), k-means clustering, local search optimization techniques, expectation maximization, linear regression, multivariate adaptive regression splines, logistic regression, Bayesian networks (including naïve Bayes), kernel density estimation, principal component analysis, linear discriminant analysis, singular value decomposition, Gaussian mixture models, and/or sequential covering rule building.

Non-limiting embodiments or aspects of the systems and methods described herein provide for a system and method of provisioning a gift by, inter alia, generating a modified uniform resource locator (URL) from an original URL, an account identifier, and one or more account limits. Through use of the modified URL, a framework for gift-giving is provided such that seamless identification, payment for, and forwarding of the gift is implemented. Because of the technological nature of the URL modification, a cardholder's personal account information need not be transmitted and exposed to potential security breaches. The systems and methods disclosed herein provide a technological solution to existing methods of giving gifts that limit when, where, and how gifts are provided.

Further to the above, and with reference to FIG. 1, in some non-limiting embodiments or aspects, provided is a system 1000 for provisioning a gift with a URL. The system 1000 includes a transaction processing system 104 that includes one or more processors programmed or configured to receive, through one or more networks 101, a request to transmit a gift. In some non-limiting embodiments or aspects, the request may be received from a merchant system 102. In some non-limiting embodiments or aspects, the transaction processing system 104 may be part of a merchant system 102. In some non-limiting embodiments or aspects, the request may be received from a cardholder device 108. Those of skill in the art will appreciate that either merchant system 102 or cardholder device 108 may be the source of the request, depending on the type of interface utilized for conducting e-commerce (e.g., websites, remote applications, client-side applications, browser plugins, or the like). In some non-limiting embodiments, a cardholder, using cardholder device 108, peruses a merchant's website or application and identifies a gift certificate or item (e.g., one or more products or services) that is to be provided as a gift to a recipient.

In some non-limiting embodiments or aspects, and with continued reference to FIG. 1, the cardholder device 108 and/or merchant system 102 communicates a URL associated with the item (referred to as the original URL) to the transaction processing system 104. The original URL may be a URL visible to a user in an input field of a web browser application or in the body of a webpage, as examples. In some non-limiting embodiments or aspects, the cardholder device 108 communicates with transaction processing system 104 through a browser extension or plug-in, electronic wallet application, or other method that does not require participation of the merchant system 102. While a situation in which the original URL directs a device to a webpage or mobile application page associated with a specific item is exemplified below, those of skill in the art will appreciate that the original URL can be associated with a gift certificate, allowing a cardholder to gift a specific amount or range of amounts that can be redeemed through a particular merchant's website/application.

In some non-limiting embodiments or aspects, the transaction processing system 104, upon receipt of the original URL, validates the original URL to ensure that the original URL directs a device to a webpage associated with an item. For example, while many merchants utilize a URL that clearly identifies the merchant and item (e.g., in the text of the URL itself), other merchants utilize a random string that is converted by the merchant system to direct a device to the appropriate webpage. In some non-limiting embodiments or aspects, validating the original URL involves determining whether the original URL corresponds to a known merchant and determining whether the original URL corresponds to an item that is available for purchase. In some non-limiting embodiments or aspects, a merchant may register or subscribe with the gift provisioning system described herein and, thus, the transaction processing system 104 may verify that the original URL is a URL that directs a device to a specific webpage or application page. In some non-limiting embodiments or aspects, the step of validating the original URL is based on machine learning. In some non-limiting embodiments or aspects, the step of validating includes a look-up table mapping known merchants to particular URL roots or strings, which is iteratively populated. Various other methodologies may be used to validate the original URL.

In some non-limiting embodiments or aspects, the cardholder device 108 and/or merchant system 102 communicates information relating to the cardholder's payment device, such as an account identifier. Transaction processing system 104 may then, based at least on the account identifier, retrieve information associated with the cardholder's payment device. In some non-limiting embodiments or aspects, the transaction processing system 104 retrieves one or more account limits associated with the cardholder's account identifier. In some non-limiting embodiments or aspects, the cardholder provides the one or more account limits during the process. In some non-limiting embodiments or aspects, the account limits are one or more of a category limit, an item limit, a price limit, a time limit, and an identity limit. A category limit may be a limit on the type or category of good or service that is being gifted. An item limit may be a limit as to the specific item that is being gifted, for example, an item limit may be a limit that restricts gifts to only charcoal grills. A price limit may be a limit on the monetary amount of any good or service being gifted. In some non-limiting embodiments or aspects, the price limit may be a limit to a single amount, or may be a maximum amount. A time limit may be a limit on the duration for which a gift is redeemable. An identity limit may be a limit on the identity of the recipient of the gift. In some non-limiting embodiments or aspects, the identity limit is an email address, telephone number, or the like that is associated with a single individual who is to receive the gift. For example, and without limitation, a cardholder may restrict the gift being provisioned to a Weber® charcoal grill that does not exceed $200. Those of skill in the art will appreciate that any combination of account limits may be applied to a gift provisioned using the systems and methods described herein.

With further reference to FIG. 1, transaction processing system 104 may communicate with URL generation system 105 to generate a modified URL based on the original URL. In some non-limiting embodiments or aspects, URL generation system 105 is part of transaction processing system 104. In some non-limiting embodiments or aspects, the URL generation system 105 is separate from transaction processing system 104. In some non-limiting embodiments or aspects, the modified URL is generated based on the original URL and the account identifier. In some non-limiting embodiments or aspects, the account identifier is a primary account number (PAN). In some non-limiting embodiments or aspects, the URL generation system 105 tokenizes the PAN. In some non-limiting embodiments or aspects, the modified URL is generated based on the original URL, the account identifier, and one or more account limits. In some non-limiting embodiments or aspects, the URL generation system 105 tokenizes the PAN and the account limit. In some non-limiting embodiments or aspects, the token that is generated has an expiration date. In some non-limiting embodiments or aspects, the account identifier is obtained from cardholder device 108, for example, and without limitation, from an electronic wallet application. In some non-limiting embodiments or aspects, the account identifier is obtained from cardholder device 108 as a token.

With continued reference to FIG. 1, in some non-limiting embodiments or aspects the URL generation system 105 generates a modified URL that is then transmitted to the cardholder device 108 by the transaction processing system 104 or the URL generation system 105. In some non-limiting embodiments or aspects, transaction processing system 104 may communicate the modified URL directly to a recipient device (not shown). In some non-limiting embodiments or aspects, URL generation system 105 generates a full-length URL that includes the original URL and the tokenized account identifier. In some non-limiting embodiments or aspects, URL generation system 105 stores the original URL and, optionally, account identifier, in a database 106, maps the modified URL to the original URL, and transmits the modified URL to the cardholder device 108. In some non-limiting embodiments or aspects, the database 106 maps and stores the modified URL to the original URL and one or both of the tokenized account identifier or the account identifier itself.

In some non-limiting embodiments or aspects, the URL generation system 105 generates both a full-length modified URL as described above and a shortened modified URL. In some non-limiting embodiments or aspects, the shortened URL is based at least in part on a merchant identifier, item URL, and/or item price. In some non-limiting embodiments or aspects, the shortened URL is based at least in part on an authentication or authorization for the account identifier. In some non-limiting embodiments or aspects, the authentication or authorization is obtained from the cardholder device 108. In some non-limiting embodiments or aspects, the authentication or authorization is obtained from an electronic wallet application.

In some non-limiting embodiments or aspects, the URL generation system 105 stores the full-length URL in a database 106, maps the shortened URL to the full-length URL and transmits the shortened URL to the cardholder device 108. In some non-limiting embodiments or aspects, the modified (full-length or shortened) URL is generated by a random value or hashing of one or more of the original URL, the account identifier, the one or more account limits, and/or other data. In some non-limiting embodiments or aspects, the shortened URL may, upon being visited, execute a script that redirects a browser to the full-length modified URL. Examples of non-limiting mapping of URL(s) to token(s) is provided below in Tables 1 and 2:

TABLE 1

| Shortened URL | Original URL | Token |
|---|---|---|
| vi.sa.com/xdfd65e234rrt | https://www.amazon.com/dp/B06XCM9LJ4/ref=fs ods ha dr | 3PST4155XTRP9932XOSLO$@NA |

TABLE 2

| Shortened URL | Full-Length URL |
|---|---|
| vi.sa.com/xdfd65e234rrt | https://www.amazon.com/dp/B06XCM9LJ4/ref=fs ods ha dr?token=3PST4155XTRP9932XOSLO$@NA |

Figure 2:
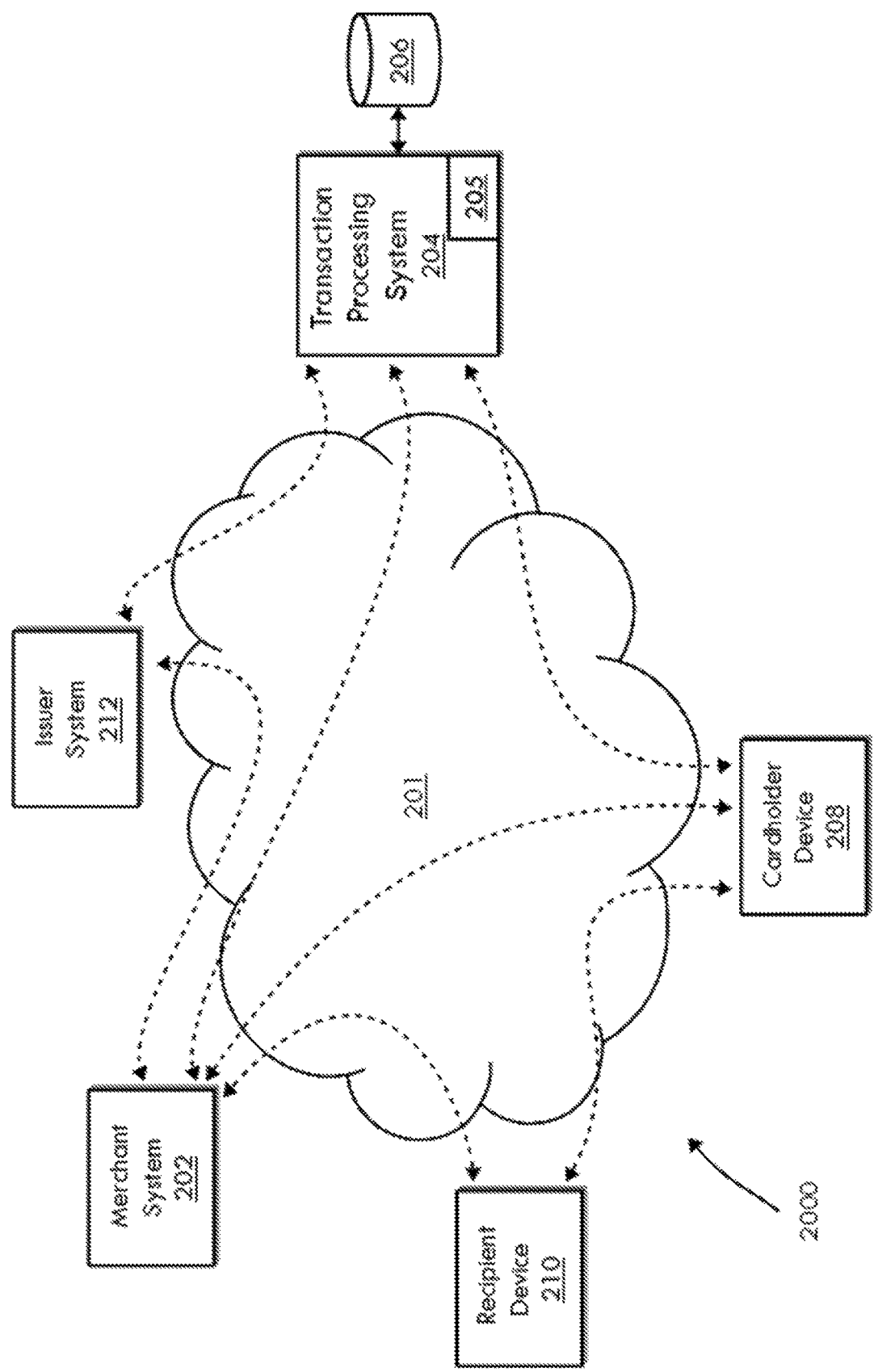
FIG. 2 is a schematic diagram of one non-limiting embodiment or aspect of a system for provisioning a gift with a URL.

With reference to FIG. 2, in some non-limiting embodiments or aspects, a system 2000 for provisioning a gift includes a transaction processing system 204 that, upon receipt of a request to provision a gift from a merchant system 202 or cardholder device 208 including an original URL, generates, with URL generation system 205, a modified URL. In some non-limiting embodiments or aspects, transaction processing system 204 transmits an authorization request message to an issuer system 212 associated with the cardholder's account identifier. In some non-limiting embodiments or aspects, the transaction processing system 204 receives an indication from the issuer system 212 that the transaction is authorized, such as an authorization response message.

In some non-limiting embodiments or aspects, after receiving an authorization response message indicating that the transaction is authorized, the transaction processing system 204 instructs the URL generation system 205, which as described above may be part of or separate from transaction processing system 204, to generate a modified URL based on the original URL, account identifier, and one or more account limits. Transaction processing system 204 and/or URL generation system 205 can then transmit the modified URL to the cardholder device 208.

With continued reference to FIG. 2, when a gift recipient receives, with recipient device 210, the modified URL, the recipient can enter the modified URL into a web browser or mobile application or click on a hyperlink to cause a web browser or application to be directed to the modified URL. In some non-limiting embodiments or aspects, the modified URL may automatically direct the recipient's device 210 to the website for the item. In some non-limiting embodiments or aspects, the modified URL may cause a request to be communicated to the transaction processing system 204 to resolve the modified URL. In some non-limiting embodiments or aspects, resolving the modified URL may include retrieving the original URL and account identifier based on a look-up table or database query. In some non-limiting embodiments, resolving the modified URL may include identifying the full-length modified URL based on the shortened modified URL. In some non-limiting embodiments or aspects, the transaction processing system 204 may tokenize the account identifier and transmit the original URL and tokenized account identifier as a packet to the merchant system 202 to complete the transaction. In some non-limiting embodiments or aspects, the transaction processing system 204 submits a transaction authorization request message to issuer system 212 associated with the account identifier.

As described above, in some non-limiting embodiments or aspects, URL generation system 105, 205 may be part of transaction processing system 104, 204, or may be a distinct system. In some non-limiting embodiments or aspects, transaction processing system 104, 204 may be two processing systems. For example, in some non-limiting embodiments or aspects, a first processing system receives a request to transmit a gift, the request including an original URL as described above. The first transaction processing system may then generate a modified URL based on the original URL, an account identifier, and one or more account limits as described above. The first processing system may then transmit the modified URL to the cardholder device 108. When the modified URL is entered into a web browser or application by the recipient, a second processing system may receive and resolve the modified URL. In some non-limiting embodiments or aspects, both processing systems may access the same database that maps the modified URL to the original URL and, in some non-limiting embodiments, the account identifier, or that maps the shortened URL to the full-length modified URL. In some non-limiting embodiments or aspects, the second transaction processing system transmits a transaction authorization request to an issuer system associated with the cardholder's account identifier.

Figure 3:
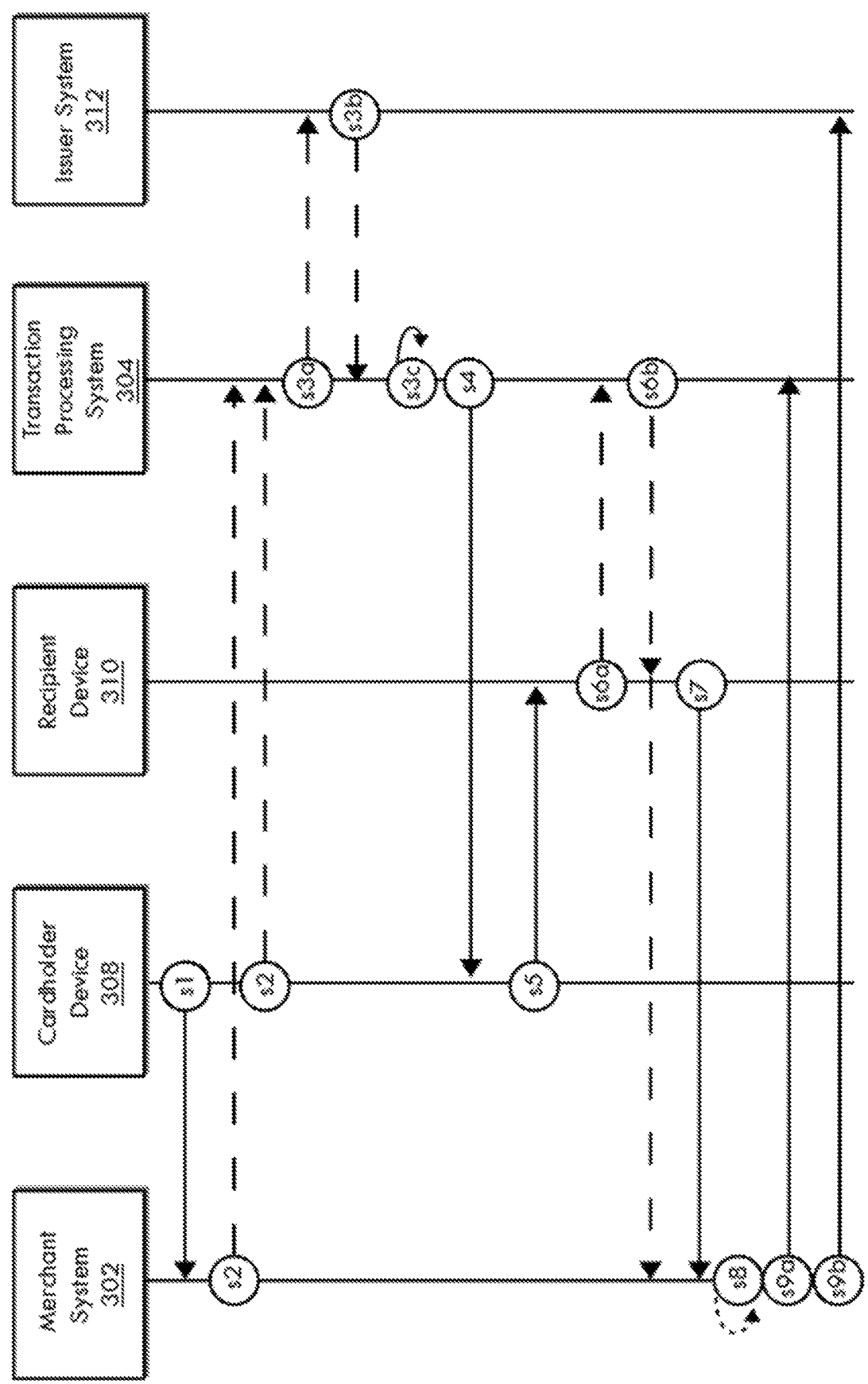
FIG. 3 is a process diagram of one non-limiting embodiment or aspect of a system for provisioning a gift with a URL.

With reference to FIG. 3, in some non-limiting embodiments or aspects, provided is a computer-implemented method for provisioning a gift using a URL. In step (s1), a cardholder, using a cardholder device 308, submits a request to a merchant system 302 to provision a gift. As described above, the gift can be a specific item, category of item, or the like. In some non-limiting embodiments or aspects, the request to provision a gift involves, in step (s2), the merchant system 302 communicating a URL corresponding to the requested item to transaction processing system 304. In some non-limiting embodiments or aspects, cardholder device 308 communicates the URL to the transaction processing system 304. In some non-limiting embodiments or aspects, the cardholder device 308 communicates the URL through a browser extension or plug-in, electronic wallet application, or other like methods that do not require the participation of the merchant system 302.

In some non-limiting embodiments or aspects, in step (s3a), the transaction processing system 304 transmits a transaction authorization request to an issuer system 312 associated with the cardholder's account identifier. In some non-limiting embodiments or aspects, in step (s3b) the transaction processing system 304 receives an indication from the issuer system 312 that the transaction is authorized. Regardless of whether steps (s3a) and (s3b) are performed, in step (s3c), the transaction processing system 304 (and/or a URL generation system) generates a modified URL, as described previously. As also described previously, the modified URL may be a shortened modified URL or a full-length modified URL, and the various modified URLs, original URL, and account identifier (tokenized or not) may be mapped in a database. In step (s4), transaction processing system 304 communicates the shortened or full-length modified URL to cardholder device 308. The cardholder device, in step (s5), communicates the modified URL to a recipient device 310 as described previously.

Thereafter, with continuing reference to FIG. 3, a recipient may make use of the modified URL to redeem the gift. In step (s6a), recipient device 310 is utilized to redeem the gift, and the device is directed to merchant system (merchant website or application) based on the modified URL. In some non-limiting embodiments or aspects in which a shortened modified URL is utilized, in step (s6a), recipient device 310 is directed to transaction processing system 304 by the shortened modified URL to allow for resolution of the shortened modified URL. In some non-limiting embodiments or aspects, transaction processing system 304 retrieves the full-length URL, and in step (s6b), communicates the full-length modified URL to recipient device 310 so that recipient device 310 is directed to merchant system (website or application) 302 in step (s7). In some non-limiting embodiments or aspects, in step (s6b), transaction processing system 304 communicates the original URL and tokenized account identifier to merchant system 302.

Regardless of whether steps (s6a) and (s6b) are performed (e.g., whether a shortened modified URL is resolved by transaction processing system 304), in step (s7) recipient device 310 is directed to merchant system 302 to redeem the gift. In some non-limiting embodiments or aspects, merchant system 302 receives the original URL (resolved by the transaction processing system 304) and the tokenized account identifier. In some non-limiting embodiments or aspects, the merchant subscribes to a gifting service or otherwise has access to the mapping of the modified URL to the original URL and, in some non-limiting embodiments, account identifier, and/or the mapping of the shortened modified URL to the full-length modified URL. In such non-limiting aspects or embodiments, merchant system 302 receives the modified URL and may resolve the modified URL in step (s8). Regardless of whether merchant system 302 or transaction processing system 304 resolves the modified URL, merchant system 302 may complete the transaction by communicating the tokenized account identifier for settlement. In some non-limiting embodiments or aspects, merchant system 302 communicates the tokenized account identifier to transaction processing system 304 in step (s9a) to settle the transaction. In some non-limiting embodiments or aspects, merchant system 302 communicates the tokenized account identifier to issuer system 312 in step (s9b) to settle the transaction.

Figure 4:
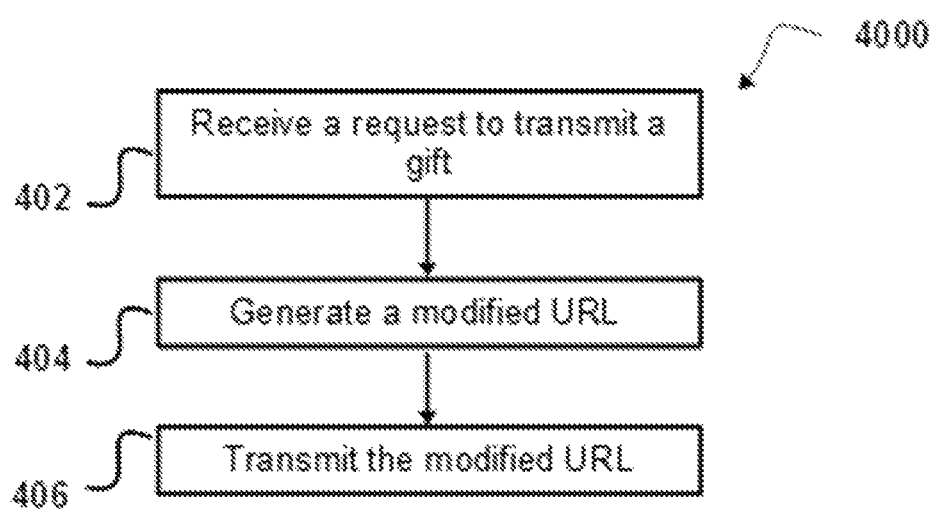
FIG. 4 is a flowchart of one non-limiting embodiment or aspect of a system for provisioning a gift with a URL.

Referring now to FIG. 4, shown is a flow diagram of a non-limiting embodiment or aspect of a method 4000 for provisioning a gift using a URL. One or more steps of the method 4000 may be performed partially or completely by a transaction processing system, such as described herein, although it will be appreciated that other devices and/or systems may perform one or more steps in some non-limiting embodiments or aspects. As shown in FIG. 4, in some non-limiting embodiments or aspects, in step 402 a request to provide a gift is received. As described previously, this request may include an original URL, account identifier, and, in some non-limiting embodiments or aspects, one or more account limits. In step 404, a modified URL is generated. As described previously, a modified URL can be a full-length or shortened modified URL and may include a tokenized account identifier. In step 406, transaction processing system transmits the modified URL to a device, for example and without limitation a device associated with a cardholder. In some non-limiting embodiments or aspects, transaction processing system communicates the modified URL directly to a recipient device.

Figure 5:
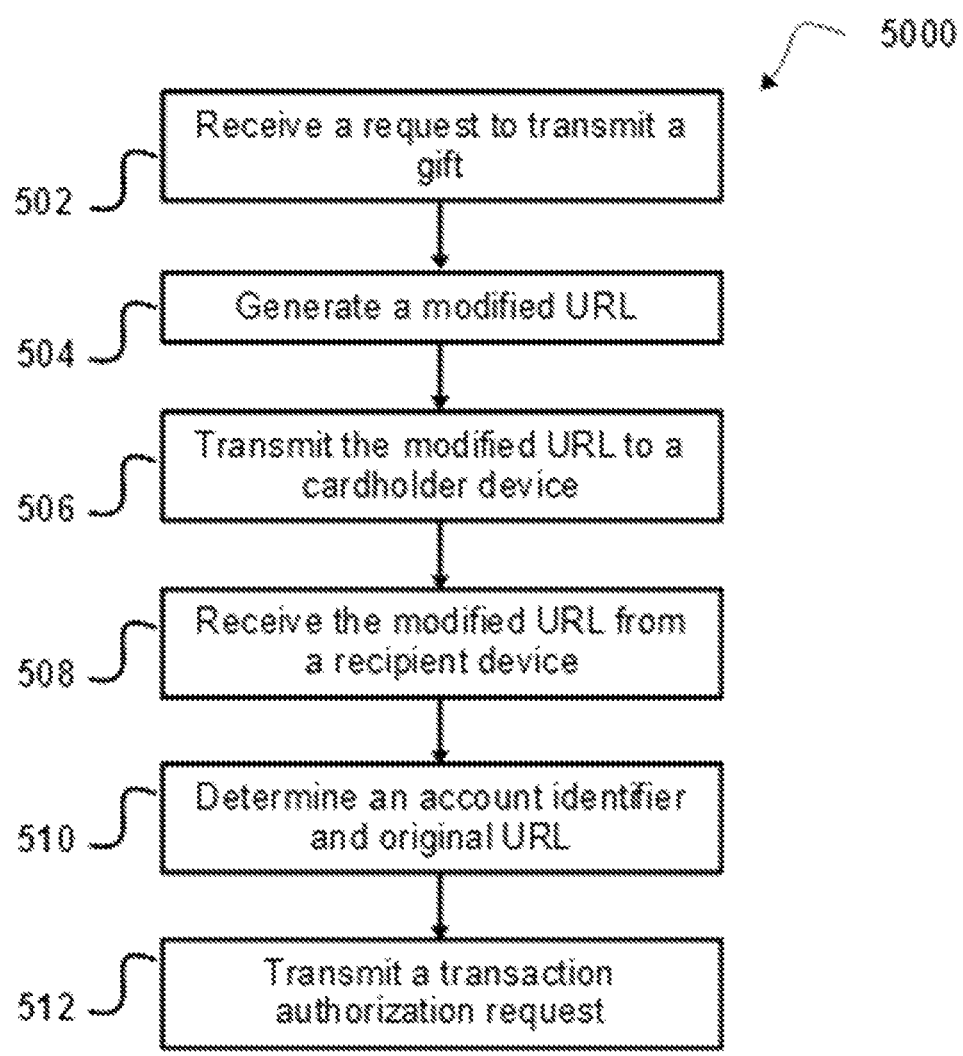
FIG. 5 is a flowchart of one non-limiting embodiment or aspect of a system for provisioning a gift with a URL.

Referring now to FIG. 5, shown is a flow diagram of a non-limiting embodiment or aspect of a method 5000 for provisioning a gift using a URL. One or more steps of the method 5000 may be performed partially or completely by a transaction processing system, such as described herein, although it will be appreciated that other devices and/or systems may perform one or more steps in some non-limiting embodiments or aspects. As shown in FIG. 5, in some non-limiting embodiments or aspects, step 502 includes receipt of a request to transmit a gift. As described previously, this request may include an original URL, account identifier, and, in some non-limiting embodiments or aspects, one or more account limits. In step 504, a modified URL is generated. As described previously, the modified URL may be a full-length or shortened modified URL and may include a tokenized account identifier. In step 506, transaction processing system transmits the modified URL to a cardholder device associated with a cardholder. In step 508, the modified URL is received from a recipient device associated with a recipient of the gift. As described previously, in step 510 the modified URL is resolved to determine the original URL and the account identifier. This resolution may occur, for example, and without limitation, by analyzing a mapping of a shortened modified URL to a full-length modified URL, or mapping of a modified URL (shortened or full length) to the original URL and the account identifier and/or tokenized account identifier. In step 512, a transaction authorization request is transmitted to a transaction processing system and/or an issuer system to settle the transaction.

Although the systems and methods have been described in detail for the purpose of illustration based on what is currently considered to be the most practical and preferred embodiments, it is to be understood that such detail is solely for that purpose and should not be considered limiting, but on the contrary, is intended to cover modifications and equivalent arrangements that are within the spirit and scope of the appended claims. For example, it is to be understood that the present systems and methods contemplate that, to the extent possible, one or more features of any embodiment can be combined with one or more features of any other embodiment.

What is claimed is:

1. A computer-implemented method for provisioning a gift, comprising:

receiving, with at least one processor, a request to provision a gift, the request comprising an original uniform resource locator (URL) corresponding to a network location associated with a merchant and/or item;

transmitting, with at least one processor, a transaction authorization request to an issuer system associated with an account identifier;

receiving, from the issuer system, an authorization response message that the transaction is authorized;

generating, with at least one processor, a token based on the account identifier;

generating, with at least one processor, a modified URL configured to direct a user device to the network location associated with the merchant and/or item, the modified URL generated by hashing the original URL, the tokenized account identifier, and one or more account limits; and transmitting, with at least one processor, the modified URL to the user device, such that the user device is facilitated to engage in a transaction through the network location associated with the merchant and/or item using a payment account associated with the account identifier.

2. The computer-implemented method of claim 1, further comprising, in response to receiving the URL, validating the URL.

3. The computer-implemented method of claim 2, wherein validating the URL comprises one or more of:
   determining whether the original URL corresponds to a known merchant; and
   determining whether the original URL corresponds to an item that can be purchased.

4. The computer-implemented method of claim 2, wherein validating the URL is based at least partially on a machine learning algorithm.

5. The computer-implemented method of claim 1, wherein the one or more account limits comprise one or more of:
   a category limit;
   an item limit;
   a price limit;
   a time limit; and
   an identity limit.

6. The computer-implemented method of claim 5, wherein the price limit is a maximum amount or an exact amount.

7. The computer-implemented method of claim 5, wherein the identity limit is an email address or telephone number associated with a recipient of the modified URL.

8. The computer-implemented method of claim 1, wherein the account identifier is a primary account number (PAN).

9. The computer-implemented method of claim 1, wherein generating the modified URL comprises generating a short URL that redirects a user device to the modified URL.

10. The computer-implemented method of claim 1, wherein the method further comprises:
    receiving, from a user device and with at least one processor, the modified URL;
    determining, with at least one processor, the original URL and account identifier from the modified URL; and
    transmitting, with at least one processor, a transaction authorization request to an issuer system associated with the account identifier.

11. The computer-implemented method of claim 10, wherein determining the URL and account identifier comprises:
    receiving, from a merchant system and with at least one processor, the modified URL;
    determining, with at least one processor and from a database, the URL and account identifier; and
    transmitting, with at least one processor, the URL and account identifier to the merchant system.

12. The computer-implemented method of claim 10, wherein transmitting the original URL and account identifier comprises generating a token comprising the account identifier and transmitting the URL and token to the merchant system.

13. The computer-implemented method of claim 1, wherein the token further comprises the account limit and the modified URL comprises the tokenized account limit.

14. A system for provisioning a gift, comprising a processor programmed or configured to:
    receive a request to transmit a gift, the request comprising an original uniform resource locator (URL) corresponding to an application or webpage associated with a merchant or item;
    transmit a transaction authorization request to an issuer system associated with an account identifier;
    receive, from the issuer system, an authorization response message that the transaction is authorized;
    generate a token based on the account identifier;
    generate a modified URL configured to direct a user device to the application or webpage associated with the merchant or item, the modified URL generated by hashing the original URL, the tokenized account identifier, and one or more account limits; and
    transmit the modified URL to the user device.

15. The system of claim 14, wherein the processor is further programmed or configured to:
    receive the modified URL;
    determine the original URL and account identifier from the modified URL; and
    transmit a transaction authorization request to an issuer system associated with the account identifier.

16. The system of claim 14, wherein the system further comprises a second processor programmed or configured to:
    receive the modified URL;
    determine the URL and account identifier from the modified URL; and
    transmit a transaction authorization request to an issuer system associated with the account identifier.

17. The system of claim 14, wherein the processor is further programmed or configured to:
    in response to receiving the URL, validating the URL, wherein validating the URL comprises one or more of:
      determining whether the original URL corresponds to a known merchant; and
      determining whether the original URL corresponds to an item that can be purchased.

18. The system of claim 17, wherein the step of validating the URL is based at least partially on a machine learning algorithm.

19. A computer program product for provisioning a gift, comprising at least one non-transitory computer-readable medium including program instructions that, when executed by at least one processor, causes the at least one processor to:
    receive, a request to provision a gift, the request comprising an original uniform resource locator (URL) corresponding to a network location associated with a merchant and/or item;
    transmit a transaction authorization request to an issuer system associated with an account identifier;
    receive, from the issuer system, an authorization response message that the transaction is authorized;
    generate a token based on the account identifier;
    generate a modified URL configured to direct a user device to the network location associated with the merchant and/or item, the modified URL generated by hashing the original URL, the tokenized account identifier, and one or more account limits; and
    transmit the modified URL to the user device, such that the user device is facilitated to engage in a transaction through the network location associated with the merchant and/or item using a payment account associated with the account identifier.

20. The system of claim 14, wherein the account identifier is a primary account number (PAN).

21. The system of claim 14, wherein the token further comprises the account limit and the modified URL comprises the tokenized account limit.

* * * * *